US006198551B1

(12) United States Patent
Tabata (10) Patent No.: US 6,198,551 B1
(45) Date of Patent: Mar. 6, 2001

(54) IMAGE READING APPARATUS HAVING LINE SENSORS ARRANGED IN SPECIFIC ORDER AND WITH DIFFERENT OR SAME INTERVAL BETWEEN ADJACENT LINE SENSORS

(75) Inventor: Masami Tabata, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/864,732

(22) Filed: May 28, 1997

(30) Foreign Application Priority Data

Jun. 3, 1996 (JP) .................................................. 8-140077

(51) Int. Cl.[7] ....................................................... H04N 1/46
(52) U.S. Cl. ............................ 358/514; 358/512; 358/509
(58) Field of Search ..................................... 358/514, 513, 358/515, 518, 509, 505, 506, 512, 474, 475, 482, 483, 496; 348/201, 202, 203, 206, 266, 272–281; 250/208.1, 234, 235

(56) References Cited

U.S. PATENT DOCUMENTS

| | | | | |
|---|---|---|---|---|
| 4,972,255 | * | 11/1990 | Suzuki et al. | 358/513 |
| 4,985,760 | * | 1/1991 | Maeshima et al. | 358/514 |
| 5,055,921 | * | 10/1991 | Usui | 358/512 |
| 5,153,750 | * | 10/1992 | Hiroi | 358/496 |
| 5,173,599 | * | 12/1992 | Setani | 250/208.1 |
| 5,489,995 | * | 2/1996 | Iso et al. | 358/483 |
| 5,517,329 | * | 5/1996 | Ishizuka | 358/474 |
| 5,555,107 | * | 9/1996 | Funada | 358/518 |

* cited by examiner

Primary Examiner—Cheukfan Lee
(74) Attorney, Agent, or Firm—Fitzpatrick, Cella, Harper & Scinto (57) ABSTRACT

A B line sensor is arranged at the center on a sensor array within the image formation range of a lens array, where the light amount is maximum. R and G line sensors are arranged on both sides of the B line sensor. With this arrangement, an image reading apparatus capable of suppressing variations in output levels depending on the colors of sensors and reading a high-quality image is provided.

19 Claims, 6 Drawing Sheets

SUB SCANNING - DIRECTION OPTICAL
AXIS DISPLACEMENT △L (mm)

FIG.8

IMAGE READING APPARATUS HAVING LINE SENSORS ARRANGED IN SPECIFIC ORDER AND WITH DIFFERENT OR SAME INTERVAL BETWEEN ADJACENT LINE SENSORS

BACKGROUND OF THE INVENTION

1. Field of the Invention

The present invention relates to an image reading apparatus used for a facsimile apparatus, a scanner, or the like.

2. Related Background Art

As an image reading apparatus for reading an original image, there is an apparatus having three photoelectronic conversion device arrays formed on a sensor substrate, and color filters arranged above the photoelectric conversion device arrays to split light into three color components, i.e., red (R), green (G), and blue (B) light components. In such an image reading apparatus, three light components, i.e., R, G, and B light components of light reflected by an original are simultaneously received through a lens to accumulate charges on the sensors, and R, G, and B image signals are output.

However, since the photosensitivity of a sensor with a filter becomes lower as the wavelength is shorter, the output level of the B photoelectric conversion device array is much lower than that of the R or G photoelectric conversion device array, resulting in a degradation in S/N ratio. For this reason, a blue image cannot be properly read. For example, when a solid blue original is to be read and output from an output device such as a color BJ printer, the color balance of the image undesirably becomes nonuniform.

SUMMARY OF THE INVENTION

It is an object of the present invention to suppress variations in output levels of sensors and read a high-quality image. It is another object of the present invention to suppress variations in output levels depending on the sensitivities of sensors. It is still another object of the present invention to suppress variations in output levels depending on the reception wavelengths of sensors.

In order to achieve the above objects, according to an aspect of the present invention, there is provided an image reading apparatus comprising an image sensor in which a plurality of line sensors having different sensitivities are arrayed, and a lens array for forming an image of a target object on the image sensor, wherein a light amount in the lens array changes depending on an image formation position, and a line sensor having the lowest sensitivity among the plurality of line sensors is arranged at an image formation position where the light amount is maximum.

With this arrangement, variations in output levels depending on the sensitivities of sensors can be suppressed, and a high-quality image can be read.

According to another aspect of the present invention, there is provided an image reading apparatus comprising an image sensor in which a plurality of line sensors having different reception wavelengths are arrayed, and a lens array for forming an image of a target object on the image sensor, wherein a light amount in the lens array changes depending on an image formation position, and a line sensor having the shortest reception wavelength among the plurality of line sensors is arranged at an image formation position where the light amount is maximum.

With this arrangement, variations in output levels depending on the reception wavelengths of sensors can be suppressed, and a high-quality image can be read.

Other objects and features of the present invention will be apparent from the following specification and accompanying drawings.

DESCRIPTION OF THE PREFERRED EMBODIMENT

The embodiment of the present invention will be described below with reference to the accompanying drawings.

Figure 1:
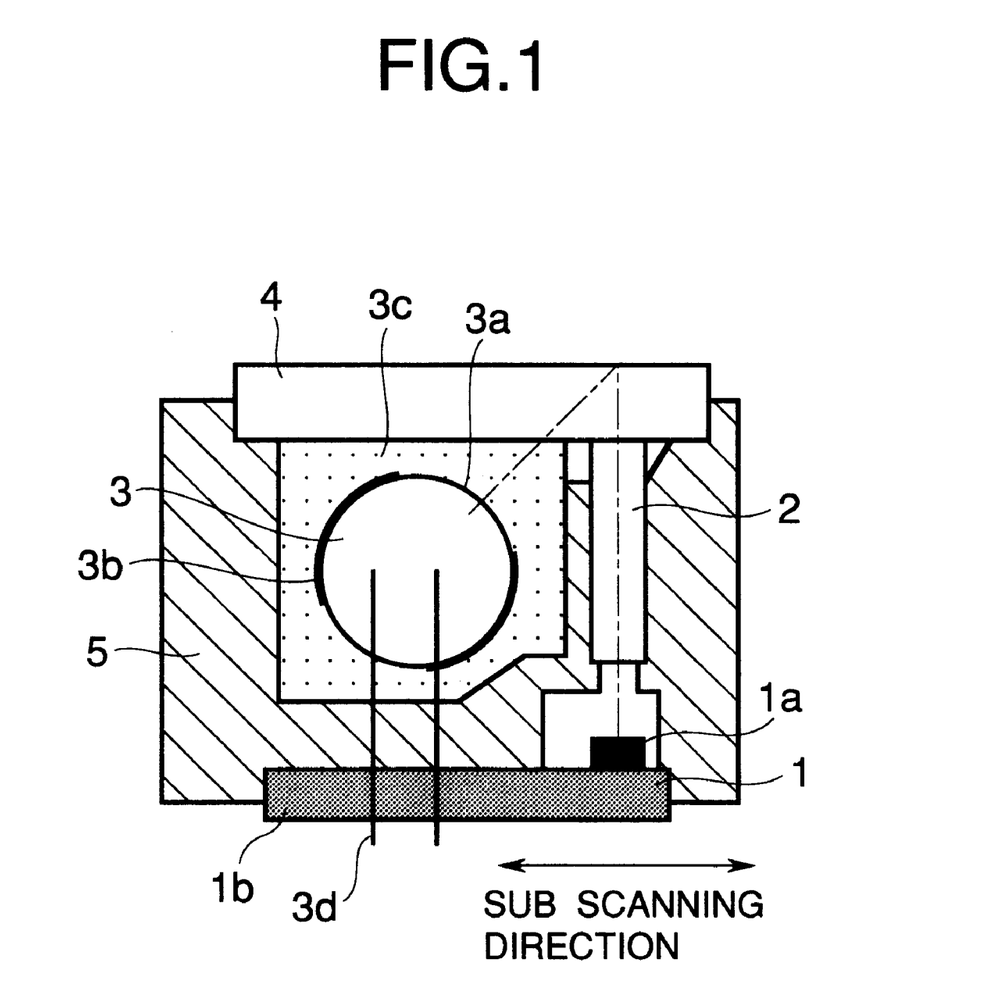
FIG. 1 is a sectional view of an image reading apparatus according to an embodiment.
Figure 2:
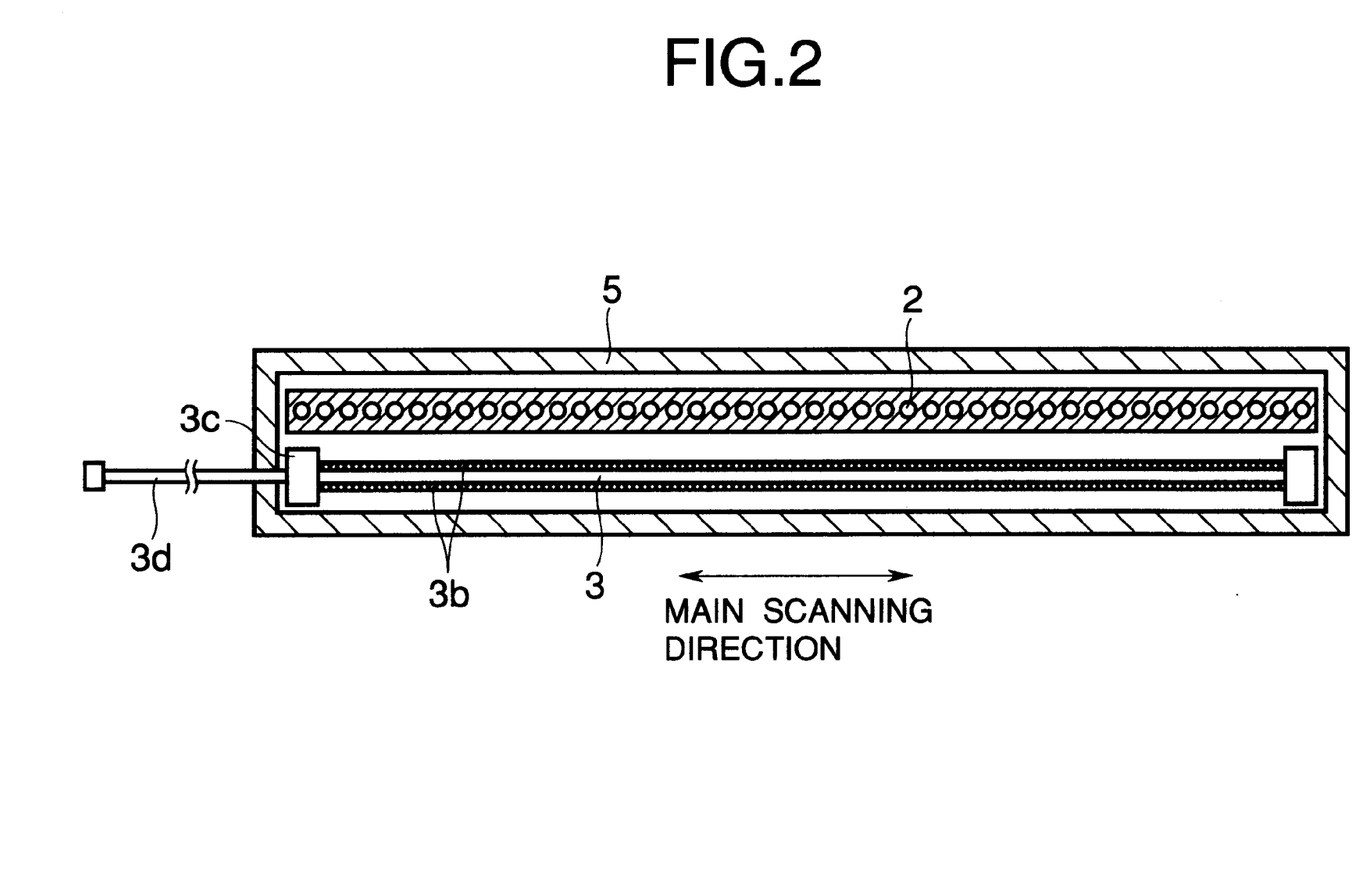
FIG. 2 is a plan view of the image reading apparatus of the embodiment.

FIG. 1 is a sectional view of a contact-type image reading apparatus according to an embodiment. FIG. 2 is a plan view of the image reading apparatus. As shown in FIGS. 1 and 2, this image reading apparatus comprises a sensor array 1, a lens array 2, a light source unit 3, a cover glass 4 for supporting an original, and a frame 5 which consists of a resin material such as polycarbonate and positions/holds these members.

Figure 3:
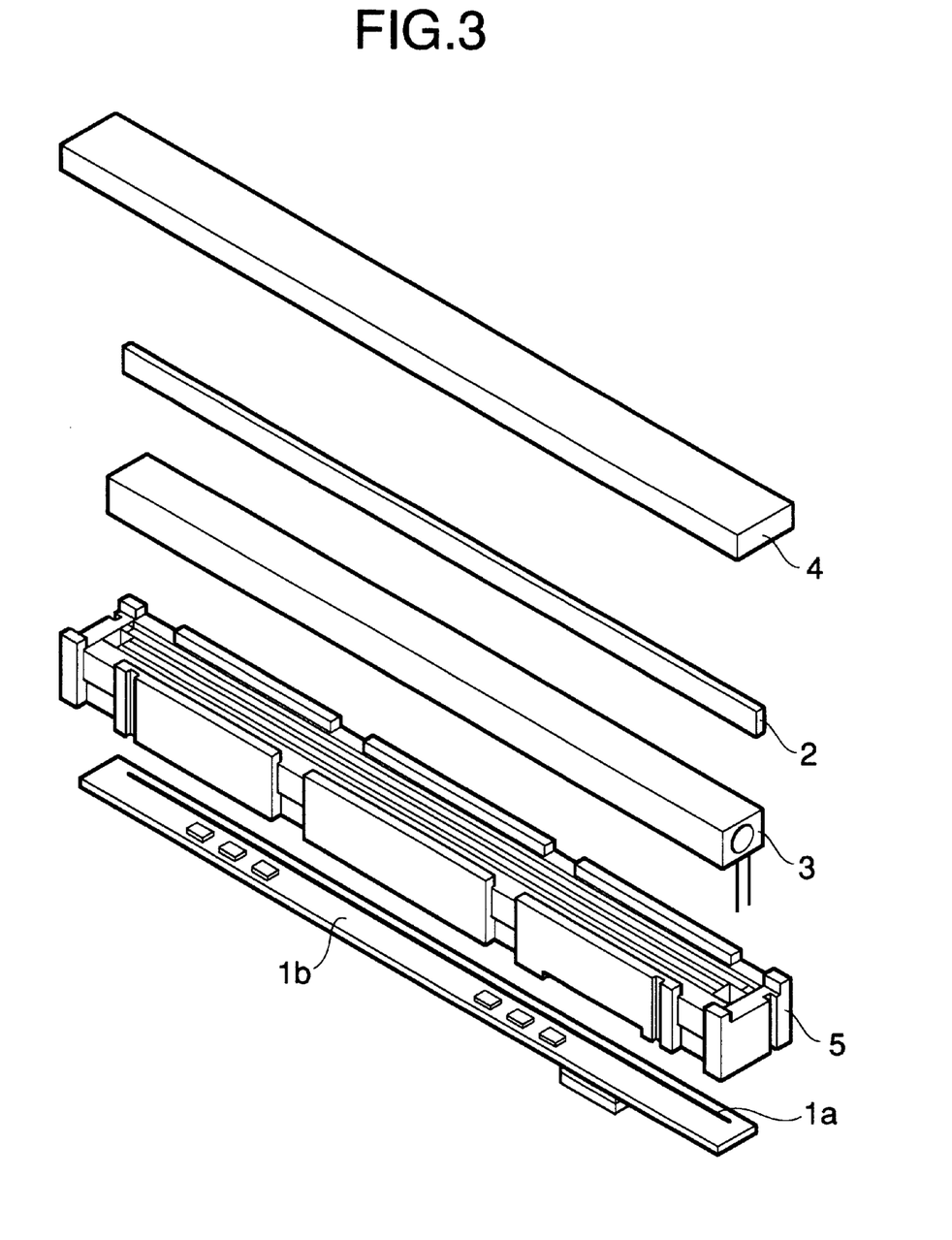
FIG. 3 is an exploded perspective view of the image reading apparatus of the embodiment.

A method of manufacturing the image reading apparatus will be described next with reference to an exploded perspective view in FIG. 3.

The lens array 2 is inserted into a groove formed in the frame 5 from the upper side. Next, the light source unit 3 constituted by holding a light source 3a with a socket 3b and a housing 3c is inserted to a predetermined position of the frame 5 from the upper side. As is apparent from the sectional view in FIG. 1, the upper surface of the light source unit 3 and that of the lens array 2, which are inserted into the frame 5, are approximately flush with each other. The cover glass 4 is fixed with an adhesive or the like on the upper surface of the frame 5 which is set even with the above plane to press the light source unit 3 and the lens array 2. With this structure, the light source unit 3 and the lens array 2 can be simultaneously fixed and positioned by the cover glass 4 without any play.

A sensor IC 1a in which three, i.e., R, G, and B photoelectric conversion device groups each having a linear shape are arranged is precisely set on a sensor substrate 1b formed of a glass epoxy resin in correspondence with the original width, thereby constituting the sensor array 1. This sensor array 1 is fitted in the lower portion of the frame 5 and fixed with an adhesive or the like, thereby completing an image sensor.

The operation of the image reading apparatus having the above arrangement will be described below. The light source 3a obliquely irradiates light onto an original (not shown) supported by the cover glass 4 at an angle of 45°. The image of light reflected by the original is formed on the sensor IC 1a through the lens array 2. The sensor IC 1a converts the optical information into an electrical signal, outputs the electrical signal, and transmits the signal to an external system. The lens array 2 forms the original image onto the sensor IC 1a at a magnification of one power. The magnification is not limited to one power, as a matter of course.

The light source 3a is constituted using, e.g., a fluorescent lamp. A phosphor is applied to the inner wall of the cylindrical glass tube 3a, and xenon gas as a rare gas is sealed in the glass tube. Two electrodes 3d are arranged parallel to each other on an other end face of the glass tube 3a. The two electrodes 3d apply an electric field to the interior of the fluorescent lamp to excite the xenon gas. The excited xenon gas molecules collide against each other to emit a UV ray. The emitted UV ray excites the phosphor applied to the inner wall of the fluorescent lamp so that light is irradiated externally. This light source is not limited to the fluorescent lamp, and an LED may be used. Alternatively, an LED may be arranged at the end portion, and a light guide for guiding light irradiated from the LED in the longitudinal direction to illuminate the original may be used.

Figure 4:
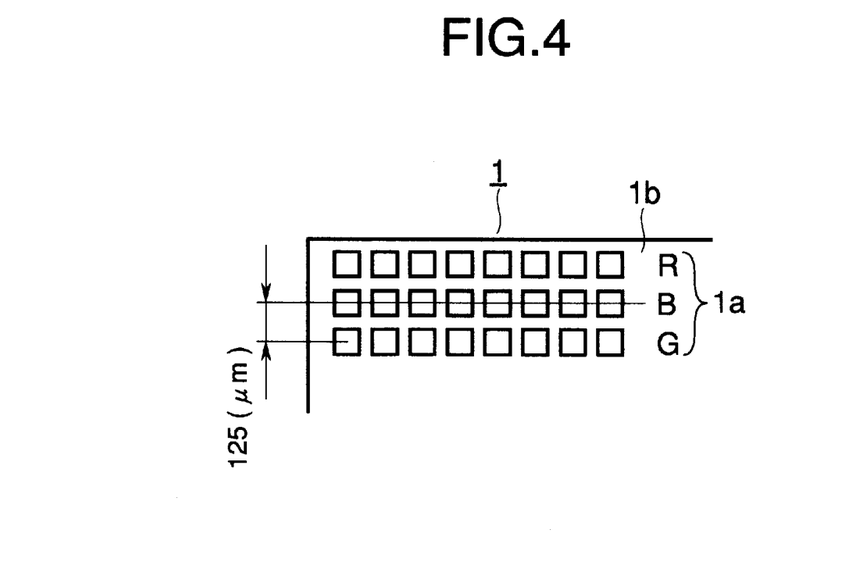
FIG. 4 is a view of a sensor substrate of the embodiment.
Figure 5:
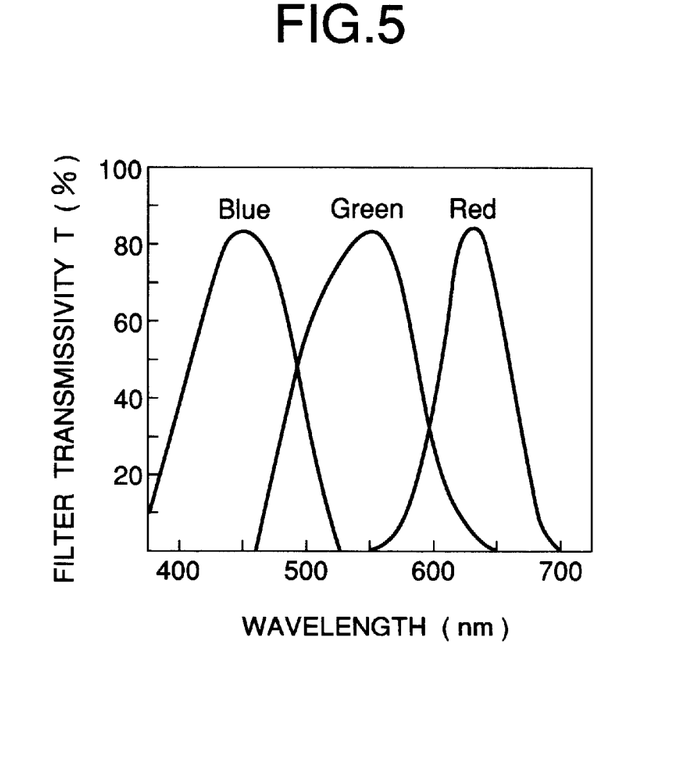
FIG. 5 is a graph showing the spectral transmissivity of a filter of the embodiment.

FIG. 4 shows the details of the sensor array 1. As shown in FIG. 4, the three photoelectric conversion device arrays for receiving R, G, and B light components, respectively, are parallelly arranged on the sensor substrate 1b of the sensor array 1. The photoelectric conversion device arrays respectively have R, G, and B color filters with spectral transmissivity characteristics shown in FIG. 5 on their upper surfaces. The photoelectric conversion device arrays are arranged at arbitrary intervals along the subscanning direction (direction perpendicular to the line direction). In FIG. 4, sensors having a resolving power of 4 (LP/mm) are arranged at intervals of 0.125 (mm).

Figure 6:
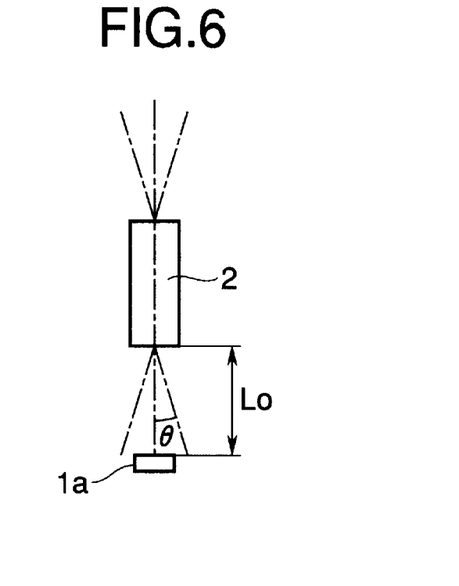
FIG. 6 is a view showing the image formation range of a lens array of the embodiment.
Figure 7:
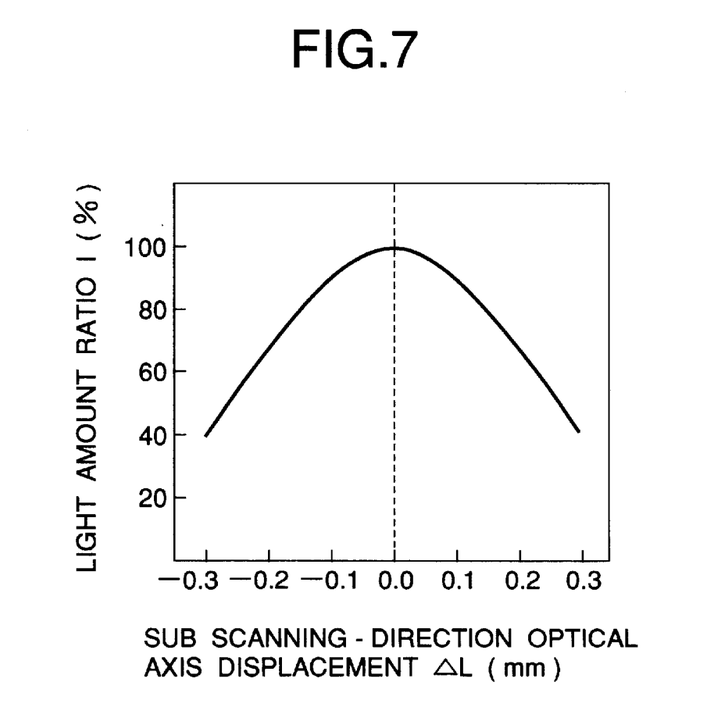
FIG. 7 is a graph showing the subscanning-direction optical axis displacement and light amount ratio of the lens array of the embodiment.

FIG. 6 shows the image formation range of the lens array 2 used in this embodiment. As shown in FIG. 6, an aperture angle θ of image formation is very small, and a space length Lo, i.e., the distance from the lens to the sensor is set to be small. For this reason, an image is formed within the narrow range of ±1 (mm) from the center of the optical axis along the subscanning direction. As for the light amount distribution of the lens array 2, the image becomes darker as it is separated farther from the center of the optical axis, as shown in FIG. 7. This phenomenon is conspicuous even at a short distance of about ±0.1 (mm). For this reason, the R, G, and B photoelectric conversion device arrays of the sensor IC 1a arranged on the sensor substrate 1b have different received light amount distributions.

Figure 8:
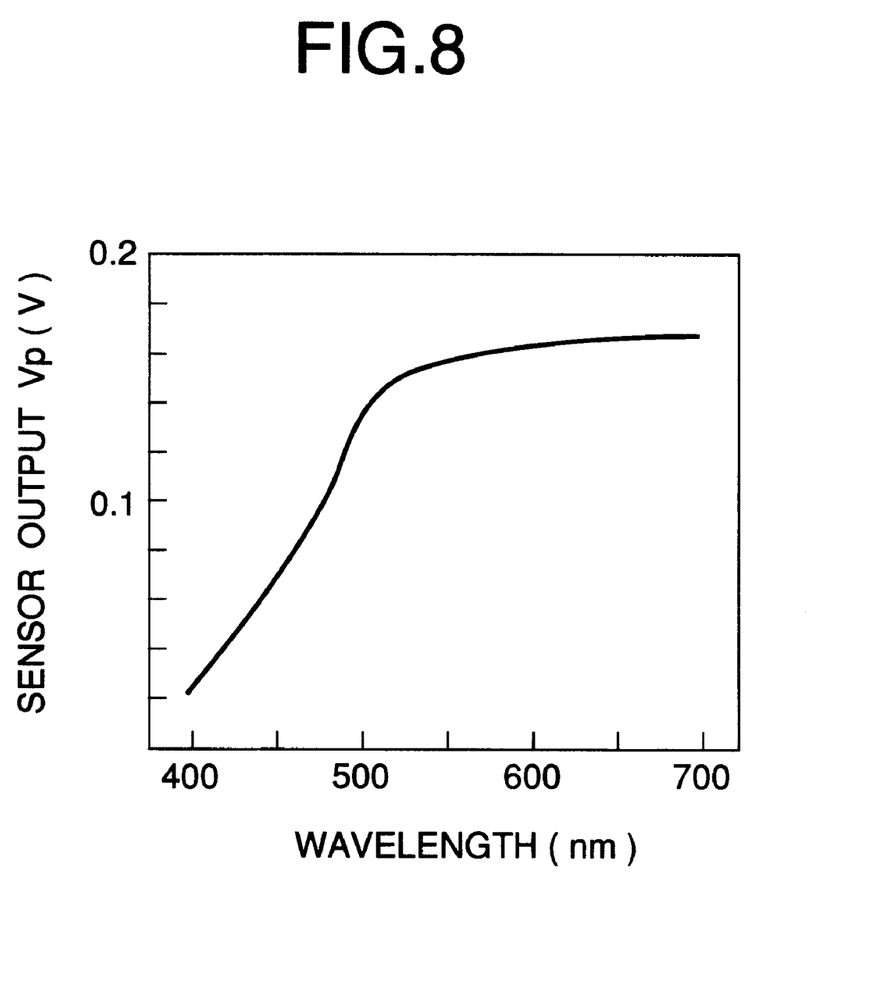
FIG. 8 is a graph showing the spectral sensitivity of a sensor IC of the embodiment.

Since the spectral sensitivity of the sensor becomes lower as the wavelength passing through the color filter is shorter, as shown in FIG. 8, the output level varies depending on the color of the filter. In this embodiment, exploiting the difference in light amount depending on the image formation position of the lens array, the B photoelectric conversion device array with the lowest sensitivity is arranged on the center line of the sensor IC 1a, as shown in FIG. 4. The B photoelectric conversion device array is arranged at the center of the optical axis of the lens array where the light amount is maximum, and the R and G sensors whose sensitivities are higher than that of the B sensor are arranged on both sides of the B sensor. With this structure, the output levels of the R, G, and B sensors can be made almost uniform.

The output levels of color sensors are determined by the spectral characteristics of light irradiated from the light source, the spectral characteristics of the lens array, the spectral characteristics of filters arranged on the sensors, and the combination of the sensitivities of the sensors. The actual arrangement is preferably determined in consideration of these factors. In this embodiment, the sensor arrays are arranged at equal intervals. When the interval is changed in accordance with the sensitivity characteristics of the sensors, the sensor output levels can be further equalized.

In this embodiment, the B photoelectric conversion device array is arranged at the center of the optical axis of the lens array 2 because the B sensor has the lowest sensitivity. However, in use of other sensors, not the B sensor but a color sensor having the lowest sensitivity may be arranged at the center of the optical axis, as a matter of course. In applications not to color line sensors but to monochromatic line sensors as well, a sensor having the lowest sensitivity may be arranged at the center. With this arrangement, the sensor can exhibit the same output level as that of the remaining sensors.

With the above arrangement, sufficient light can be irradiated on the line sensor having the lowest sensitivity or the line sensor having the shortest reception wavelength so that variations in output levels due to the difference in sensitivities or reception wavelengths of the sensors can be minimized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
    an image sensor in which a plurality of line sensors having different sensitivities are arrayed;
    a lens array for forming an image of a target object on said image sensor; and
    a light source for irradiating light into said target object,
    wherein an arrangement order and an arranement interval of said plurality of line sensors are set according to a spectrum characteristic of the light irradiated from said light source, a spectrum characteristic of said lens array, a spectrum characteristic of a filter provided on the line sensor and a sensitivity of the line sensor.

2. An apparatus according to claim 1, wherein the sensitivities are made different by arranging filters on said line sensors.

3. An apparatus according to claim 2, wherein said color filters are R, G, and B filters, said line sensor having said B filter is arranged at the center, and said line sensors having said R and G filters are arranged on both sides of said sensor having said B filter.

4. An apparatus according to claim 1, wherein said image sensor is arranged on the basis of outputs obtained by reading, by said image sensor, light irradiated by said light source and reflected by said target object.

5. An apparatus according to claim 4, wherein said light source is a fluorescent lamp.

6. An apparatus according to claim 4, wherein said light source is an LED.

7. An apparatus according to claim 4, further comprising a frame for holding said light source, said image sensor, and said lens array.

8. An apparatus according to claim 7, further comprising holding means for holding said target object.

9. An apparatus according to claim 8, wherein said holding means is a cover glass.

10. An apparatus according to claim 9, wherein said cover glass is fixed to said frame with an adhesive.

11. An apparatus according to claim 8, wherein said light source and said lens array are fixed by said cover glass.

12. An apparatus according to claim 7, wherein said image sensor is fixed to said frame with an adhesive.

13. An apparatus according to claim 1, wherein a magnification of said lens array is substantially one power.

14. An apparatus according to claim 1, further comprising a frame for holding said image sensor and said lens array.

15. An apparatus according to claim 14, further comprising holding means for holding said target object.

16. An apparatus according to claim 15, wherein said holding means is a cover glass.

17. An apparatus according to claim 16, wherein said cover glass is fixed to said frame with an adhesive.

18. An apparatus according to claim 16, wherein said lens array is fixed by said cover glass.

19. An apparatus according to claim 14, wherein said image sensor is fixed to said frame with an adhesive.

* * * * *

UNITED STATES PATENT AND TRADEMARK OFFICE
CERTIFICATE OF CORRECTION

PATENT NO.    : 6,198,551 B1
DATED         : March 6, 2001
INVENTOR(S)   : Masami Tabata It is certified that error appears in the above-identified patent and that said Letters Patent is hereby corrected as shown below:

Title page,
Insert: -- [*] Notice:   This patent issued on a continued prosecution application filed under 37 CFR 1.53(d), and is subject to the twenty year patent term provisions of 35 U.S.C. 154(a)(2). --; and
Item [56], References Cited,
Insert:
-- FOREIGN PATENT DOCUMENTS
284959   1/1996 Taiwan --; and
Insert:
-- OTHER PUBLICATIONS
Taiwanese Patent Office Action June 20, 2000, p. 1-3 --.

Column 2,
Line 7, "embodiment:" should read -- embodiment; --.

Column 4,
Line 41, "arranement" should read -- arrangement --.

Signed and Sealed this

Thirtieth Day of July, 2002

Attest:

Attesting Officer

JAMES E. ROGAN
Director of the United States Patent and Trademark Office